US011157139B2

(12) United States Patent
Yeh et al.

(10) Patent No.: US 11,157,139 B2
(45) Date of Patent: Oct. 26, 2021

(54) OPTIMIZING OBJECT DISPLAYS ON USER INTERFACES

(71) Applicant: GOOGLE LLC, Mountain View, CA (US)

(72) Inventors: Shih-Hao Yeh, Santa Clara, CA (US); Navid Samadani-McQuirk, San Bruno, CA (US); Jack Cameron Dille, San Francisco, CA (US)

(73) Assignee: Google LLC, Mountain View, CA (US)

( * ) Notice: Subject to any disclaimer, the term of this patent is extended or adjusted under 35 U.S.C. 154(b) by 373 days.

(21) Appl. No.: 15/878,548

(22) Filed: Jan. 24, 2018

(65) Prior Publication Data

US 2019/0187863 A1 Jun. 20, 2019

Related U.S. Application Data

(60) Provisional application No. 62/607,886, filed on Dec. 19, 2017.

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 3/0481* (2013.01); *G06F 9/44* (2013.01);
(Continued)

(58) Field of Classification Search
CPC ......... H04N 21/47815; H04N 21/4126; H04N 21/4532; H04N 21/4722; H04N 21/4755;
(Continued)

(56) References Cited

U.S. PATENT DOCUMENTS 5,483,472 A * 1/1996 Overman ............. G06F 15/025
705/28
5,592,560 A * 1/1997 Deaton ................ G06Q 20/042
235/375
(Continued)

FOREIGN PATENT DOCUMENTS

EP 1 128 163 A2 8/2001

OTHER PUBLICATIONS

U.S. Appl. No. 15/878,672 to Yeh et al. filed Jan. 24, 2018.
(Continued)

*Primary Examiner* — Pei Yong Weng
(74) *Attorney, Agent, or Firm* — Dority & Manning, P.A.

(57) ABSTRACT

A computing device receives a request to render a listing of item entries on a user interface, receives a notification of selection of a user interface element on the user computing device requesting presentation of objects corresponding to each of the item entries, and determines first objects that correspond to the first item entry in the listing of item entries. The computing device analyzes each of the first objects that correspond to the first item entry by determining that the user has a preferred first object, determining that the first objects comprise the preferred first object, determining that the user has a preferred provider, and determining availability of the preferred first object at the preferred provider. The computing device renders the preferred first object in a first highlighted position on the user interface with each remaining first object that corresponds to the first item entry in a non-highlighted first position.

20 Claims, 9 Drawing Sheets

(51) Int. Cl.
| | | |
|---|---|---|
| *G06Q 30/06* | (2012.01) | |
| *G06Q 30/02* | (2012.01) | |
| *G06F 3/0481* | (2013.01) | |
| *G06F 9/44* | (2018.01) | |
| *G06Q 10/08* | (2012.01) | |

(52) U.S. Cl.
CPC ....... *G06Q 10/087* (2013.01); *G06Q 30/0282* (2013.01); *G06Q 30/0601* (2013.01); *G06Q 30/0643* (2013.01)

(58) Field of Classification Search
CPC .. H04N 21/482; H04N 5/445; H04N 5/44543; H04N 21/47; G06F 3/0482; G06F 16/951; G06F 16/903; G06F 16/9535; G06F 21/6254; G06F 16/2428; G06F 16/435; G06F 16/487; G06F 3/04815; G06F 3/04817; G06F 3/04842; G06F 3/0486; G06F 16/64; G06F 16/904; G06F 16/93; G06F 16/24575; G06F 16/2455; G06F 16/248; G06F 3/04847; G06F 3/0485; G06F 16/34; G06F 16/583; G06F 16/9024; G06F 40/279; G06F 16/358; G06F 3/0481; G06Q 30/0633; G06Q 30/0601; G06Q 30/0201; G06Q 30/0202; G06Q 30/0641
See application file for complete search history.

(56) References Cited

U.S. PATENT DOCUMENTS

| | | | | |
|---|---|---|---|---|
| 8,306,908 | B1* | 11/2012 | Barker | G06Q 30/0224 |
| | | | | 705/14.26 |
| 8,886,460 | B1 | 11/2014 | Keoshkerian | |
| 9,429,920 | B2* | 8/2016 | Minvielle | G06F 16/24 |
| 9,830,589 | B2 | 11/2017 | Xing | |
| 10,248,978 | B2* | 4/2019 | Eramian | G06Q 30/06 |
| 10,296,273 | B2* | 5/2019 | Lundberg | H04W 4/029 |
| 10,366,442 | B1* | 7/2019 | Oczkowski | G06Q 30/0631 |
| 2001/0039519 | A1* | 11/2001 | Richards | G06Q 30/02 |
| | | | | 705/7.35 |
| 2002/0055906 | A1* | 5/2002 | Katz | G06Q 30/02 |
| | | | | 705/39 |
| 2003/0028451 | A1* | 2/2003 | Ananian | G06Q 30/0615 |
| | | | | 705/26.42 |
| 2003/0158796 | A1 | 8/2003 | Balent | |
| 2004/0093274 | A1 | 5/2004 | Vanska et al. | |
| 2004/0249723 | A1* | 12/2004 | Mayer | G06Q 30/0601 |
| | | | | 705/80 |
| 2005/0188086 | A1* | 8/2005 | Mighdoll | G06F 8/65 |
| | | | | 709/225 |
| 2007/0078989 | A1* | 4/2007 | van Datta | G06Q 30/02 |
| | | | | 709/227 |
| 2007/0079326 | A1* | 4/2007 | Datta | A63F 13/61 |
| | | | | 725/34 |
| 2008/0154703 | A1* | 6/2008 | Flake | G06Q 30/0603 |
| | | | | 705/14.68 |
| 2008/0245863 | A1* | 10/2008 | Buchheit | G06Q 30/02 |
| | | | | 235/383 |
| 2010/0030624 | A1* | 2/2010 | Vanska | G06Q 30/0639 |
| | | | | 705/14.64 |
| 2010/0174599 | A1* | 7/2010 | Rosenblatt | G06Q 30/02 |
| | | | | 705/14.37 |
| 2012/0158516 | A1* | 6/2012 | Wooten, III | G06Q 30/0269 |
| | | | | 705/14.66 |
| 2012/0158536 | A1* | 6/2012 | Gratton | G06Q 30/0631 |
| | | | | 705/26.7 |
| 2012/0277991 | A1* | 11/2012 | Wagner | G06Q 30/00 |
| | | | | 701/410 |
| 2012/0303480 | A1* | 11/2012 | Stone | G06Q 30/00 |
| | | | | 705/26.8 |
| 2013/0066740 | A1* | 3/2013 | Ouimet | G06Q 30/06 |
| | | | | 705/26.7 |
| 2013/0218463 | A1 | 8/2013 | Howard et al. | |
| 2014/0279208 | A1* | 9/2014 | Nickitas | G06Q 30/0631 |
| | | | | 705/26.7 |
| 2014/0324537 | A1* | 10/2014 | Gilbert | G06Q 30/0201 |
| | | | | 705/7.31 |
| 2014/0330841 | A1* | 11/2014 | Barrett | G06F 16/951 |
| | | | | 707/748 |
| 2014/0344051 | A1* | 11/2014 | Ouimet | G06Q 30/0247 |
| | | | | 705/14.46 |
| 2015/0058154 | A1 | 2/2015 | Appleyard et al. | |
| 2015/0228004 | A1* | 8/2015 | Bednarek | G06Q 30/0633 |
| | | | | 705/26.8 |
| 2016/0203408 | A1* | 7/2016 | Shita | H04L 67/10 |
| | | | | 706/11 |
| 2016/0253710 | A1* | 9/2016 | Publicover | H04N 21/2668 |
| | | | | 705/14.66 |
| 2017/0031904 | A1* | 2/2017 | Legrand | G06F 16/34 |
| 2017/0039198 | A1* | 2/2017 | Ramamurthy | G06F 16/93 |
| 2017/0192626 | A1 | 7/2017 | Virk et al. | |
| 2018/0211303 | A1* | 7/2018 | Chatwin | G06N 20/00 |
| 2019/0205905 | A1* | 7/2019 | Raghunathan | G06N 3/0454 |

OTHER PUBLICATIONS

Kuhn, "International Search Report and Written Opinion issued in International Application No. PCT/US2018/045079", dated Oct. 30, 2018, 16 pages.
U.S. Appl. No. 16/134,896 to Yeh et al. filed Sep. 18, 2018.
International Preliminary Report on Patentability for Application No. PCT/US2018/044711, dated Jul. 2, 2020, 9 pages.

* cited by examiner

OPTIMIZING OBJECT DISPLAYS ON USER INTERFACES

CROSS-REFERENCE TO RELATED APPLICATION

This patent application claims priority to U.S. Patent Application No. 62/607,886, filed Dec. 19, 2017, and entitled "Optimizing Object Displays On User Interfaces." The entire contents of the above-identified application are hereby fully incorporated herein by reference.

TECHNICAL FIELD

The technology disclosed herein relates to optimizing presentation of objects on a user interface.

BACKGROUND

Users often create lists that comprise generalized terms and item descriptions. The user is then required to transform these lists of generalized terms into corresponding objects. However, multiple objects can correspond to each generalized term. Conventional systems require the user to perform online searches for each generalized term to return multiple objects.

Additionally, conventional systems return a listing of the multiple objects without reference to the user's preference or intent when entering the generalized term. Without mapping the user's intent to the multiple objects, the user is presented with a random, non-optimized listing of multiple objects.

SUMMARY

Techniques herein provide computer-implemented methods to optimize object display on a user interface. In an example, one or more computing devices receives a request to render a listing of item entries on a user interface of a user computing device, the listing of item entries comprising two or more item entries. The one or more computing devices receives a notification of selection of a user interface element on the user computing device requesting presentation of objects corresponding to each of the two or more item entries and determines two or more first objects that correspond to a first item entry in the listing of item entries. The one or more computing devices analyzes each of the two or more first objects that correspond to the first item entry by determining that a user of the user computing device has a preferred first object, determining that the two or more first objects comprise the preferred first object, determining that the user of the user computing device has a preferred provider, and determining availability of the preferred first object at the preferred provider. The one or more computing devices renders the preferred first object in a first highlighted position on the user interface of the user computing device with each remaining first object that corresponds to the first item entry in a non-highlighted first position. In an example, the first highlighted position comprises a position on a leftmost edge of a display of the two or more first objects that correspond to the first item entry. In another example, each remaining first object that correspond to the first item entry are displayed on the right of the first highlighted position.

In certain other example aspects described herein, systems and computer program products to optimize item display on a user interface are provided.

These and other aspects, objects, features, and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

Figure 1:
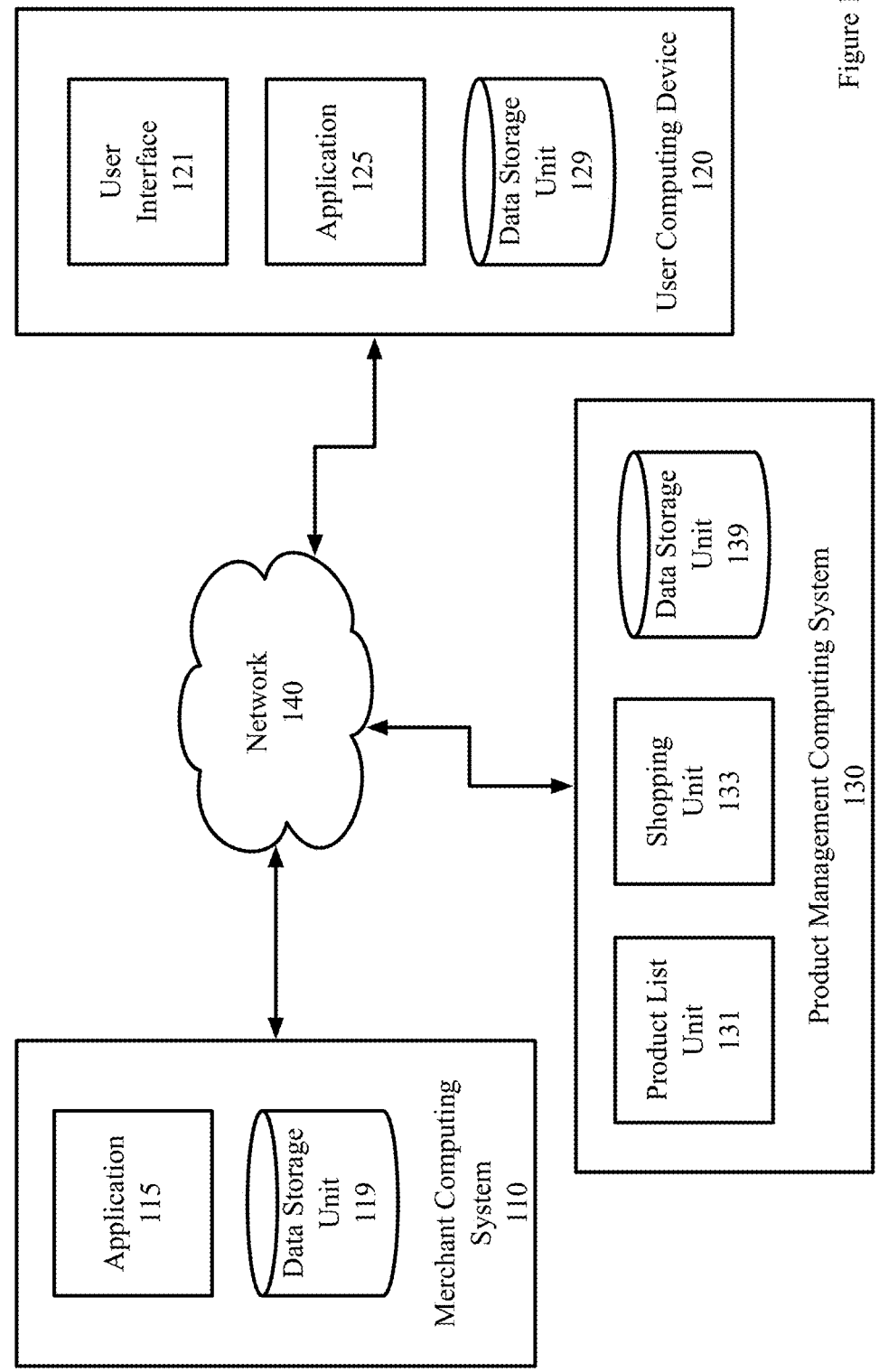
FIG. 1 is a block diagram depicting a system to optimize object presentation, in accordance with certain examples.

Embodiments herein provide computer-implemented techniques to optimize presentation of items displayed on a user interface. In an example, a user accesses a list of items on a user computing device. In an example, the user presses a user interface element or directs an application on the user computing device to find available recommended objects that correspond to the items entered on the list. An example user interface element comprises a button or control to recommend objects that correspond to the items on the list of items.

In response to receiving the request to provide recommended objects corresponding to items on the list of items, a management computing system identifies objects that correspond to each item on the list and determines where each identified object is located. The management computing system also determines whether the user has preferences or defined rules regarding which objects/locations are preferred by the user. In an example, the management computing system determines the user's preferences based on the user's past behaviors and/or selected rules. In another example, the user has a preference to travel to the fewest number of locations to obtain objects. In yet another example, the user has two or more preferences that are applied in combination or in sequential order.

In an example, the management computing system determines an optimized presentation of each object that corresponds to each item on the user's list based on the user's preferences. An example optimized presentation comprises a first object shown in a highlighted position. An example highlighted position comprises a position on the left-most edge of the listing of objects with additional objects corresponding to the item on the user's list displayed to the right of the highlighted product. In other examples, the highlighted product is positioned in the center of the user interface or in a position that comprises stylized text, an icon, or badge indicating that the object and/or location is preferred.

In an example, the management computing system determines whether the user has a preference for or a history of selecting an object matching an item on the list and whether user has a preference for or history of selecting objects at a particular location. In these example, the management computing system maps an identified objects to known selections and user preferences to predict the user's intent when entering the item on the list. In another example, the management computing system determines that an object is available from a location that has a different object presented in a highlighted position. In this example, the management computing system infers that the user is likely visiting the location for one object, so it presents a second object from the same location in a highlighted position.

In an example, the optimized listing of available objects is displayed on the user interface of the user computing device. In an example, the optimized listing comprises two or more objects shown with at least one of the two or more objects shown in a highlighted display position. In this example, showing the object in the highlighted display position directs the user's attention to the object. In an example, the determination of the optimized listing is performed in real time or near real time so that once the user presses the user interface element to search the list, the optimized display is returned to the user computing device.

By using and relying on the methods and systems described herein, the system to optimize object presentation provides improvements and enhancements over conventional systems, for instance by improving the way the data is processed to address a complex combinatorial problem. The product management computing system processes multiple streams of data, user parameters, multiple merchant inventories, multiple product possibilities, and multiple user preferences to determine the optimized presentation of items. In order to adequately search, identify, and present valid products for presentation from such a complex data set, efficient computer methods for analyzing the data set are needed. The system improves computer functionality by improving the way the data is processed to address the complex combinatorial problem and to improving computer functionality by reducing the complexity of the data set such that it can be analyzed using more computationally efficient bitwise operations.

Various examples will be explained in more detail in the following description, read in conjunction with the figures illustrating the program flow.

Turning now to the drawings, in which like numerals represent like (but not necessarily identical) elements throughout the figures, example embodiments are described in detail.

Example System Architectures

FIG. 1 is a block diagram depicting a system to optimize object presentation, in accordance with certain example embodiments. As depicted in FIG. 1, the example operating environment 100 comprises systems 110 and 130 and user computing device 120 that are configured to communicate with one another via one or more networks 140 via network computing devices. In another example, two or more of these systems (including systems 110 and 130 and user computing device 120) are integrated into the same system. In some examples, a user associated with a device must install an application and/or make a feature selection to obtain the benefits of the techniques described herein.

Each network 140 comprises a wired or wireless telecommunication mechanism by which network systems (including systems 110 and 130 and user computing device 120) can communicate and exchange data. For example, each network 140 can include, be implemented as, or may be a part of, a storage area network (SAN), personal area network (PAN), a metropolitan area network (MAN), a local area network (LAN), a wide area network (WAN), a wireless local area network (WLAN), a virtual private network (VPN), an intranet, an Internet, a mobile telephone network, a card network, Bluetooth, Bluetooth Low Energy (BLE), near field communication network (NFC), any form of standardized radio frequency, infrared, sound (for example, audible sounds, melodies, and ultrasound), other short range communication channel, or any combination thereof, or any other appropriate architecture or system that facilitates the communication of signals, data, and/or messages (generally referred to as data). Throughout this specification, it should be understood that the terms "data" and "information" are used interchangeably herein to refer to text, images, audio, video, or any other form of information that can exist in a computer-based environment.

In an example, each network system (including systems 110 and 130 and user computing device 120) comprises a device having a communication module capable of transmitting and receiving data over the network 140. For example, each network system (including systems 110 and 130 and user computing device 120) may comprise a server, personal computer, mobile device (for example, notebook computer, handheld computer, tablet computer, netbook computer, personal digital assistant (PDA), video game device, GPS locator device, cellular telephone, Smartphone, or other mobile device), a television with one or more processors embedded therein and/or coupled thereto, an appliance with one or more processors embedded therein and/or coupled thereto, or other appropriate technology that comprises or is coupled to a web browser or other application for communicating via the network 140. In the example depicted in FIG. 1, the network systems (including systems 110 and 130 and user computing device 120) are operated by merchants, users, and product management computing system operators, respectively.

The merchant computing system 110 comprises an application 115 and a data storage unit 119. In an example, the merchant operates a brick and mortar commercial store and maintains an inventory of items within the physical store that may be purchased by the user within the store location. In another example, the merchant operates an online store and maintains an inventory of items that may be purchased by the user and shipped to the user's address. In another example, the merchant operates both a brick and mortar commercial store and an online store, offering the user the option to travel to the store or have items delivered.

In an example, the merchant maintains an inventory of items available for purchase and a purchase price associated with each item. The application 115 is a program, function, routine, applet or similar entity that exists on and performs its operations on the merchant computing system 110. For example, the application 115 may be one or more of a shopping application, merchant computing system 110 application, an Internet browser, or other suitable application operating on the merchant computing system 110 that allows the merchant to maintain an inventory of items and communicate with the product management computing system 130. In some examples, the merchant must install an application 115 and/or make a feature selection on a merchant computing device to obtain the benefits of the techniques described herein.

In an example, the data storage unit 119 may be a memory unit resident on the merchant computing system 110. An example data storage unit 110 enables storage of item inventory and item prices for retrieval by or communication to the product management computing system 130. In an example, the data storage unit 119 can include any local or remote data storage structure accessible to the merchant computing system 110 suitable for storing information. In an example, the data storage unit 119 stores encrypted information, such as HTML5 local storage.

In an example, a user can view an optimized display of desired items on a user computing device 120. An example user computing device 120 comprises a user interface 121, an application 125, and a data storage unit 129. In an example, the user computing device 120 may be a personal computer, mobile device (for example, notebook, computer, tablet computer, netbook computer, personal digital assistant (PDA), video game device, GPS locator device, cellular telephone, Smartphone or other mobile device), television, wearable computing devices (for example, watches, rings, or glasses), or other appropriate technology that comprises or is coupled to a web server (or other suitable application for interacting with web page files) or that comprises or is coupled to an application 125.

The user can use the user computing device 120 to create a list of desired items and view an optimized display of the desired items via the user interface 121 and the application 125. For example, the user interface 121 comprises a touch screen, a voice-based interface, or any other interface that allows the user to provide input and receive output from the application 125. In an example, the user interacts with the application 125 via the user interface 121.

The application 125 is a program, function, routine, applet or similar entity that exists on and performs its operations on the user computing device 120. For example, the application 125 may be one or more of a shopping application, an Internet browser, a user interface 121 application, or other suitable application operating on the user computing device 120. In some examples, the user must install an application 125 and/or make a feature selection on the user computing device 120 to obtain the benefits of the techniques described herein.

In an example, the data storage unit 129 enables storage of user contact details for retrieval of a product management computing system 130 account. In an example, the data storage unit 129 can include any local or remote data storage structure accessible to the user computing device 120 suitable for storing information. In an example, the data storage unit 129 stores encrypted information, such as HTML5 local storage.

Figure 4:
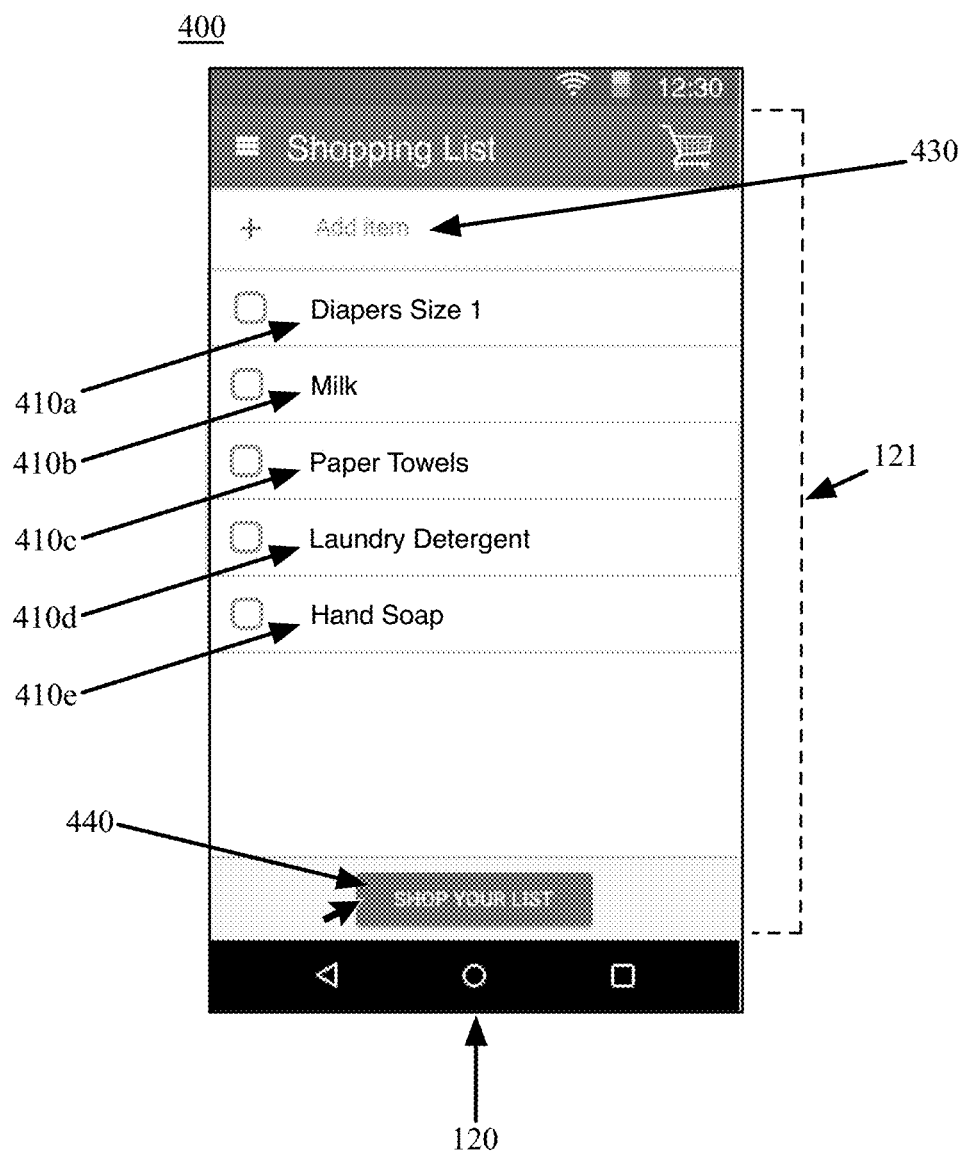
FIG. 4 is a block diagram depicting a shopping list display on a user interface, in accordance with certain examples.

In an example, the user communicates with the product management computing system 130 using the application 125 and the user interface 121. An example product management computing system 130 comprises a product list unit 131, a shopping unit 133, and a data storage unit 139. An example product list unit 131 communicates with the user computing device 120 to create a listing of desired items, add items to an existing list, delete items from a list, and otherwise manipulate the list and/or items on the list. In an example the user manipulates user interface elements displayed on the user interface 121 of the user computing device 120 to manipulate the list and/or items on the list. In an example, the listing of items comprises a shopping list and each item comprises a product. An example shopping list is shown in FIG. 4.

Figure 7:
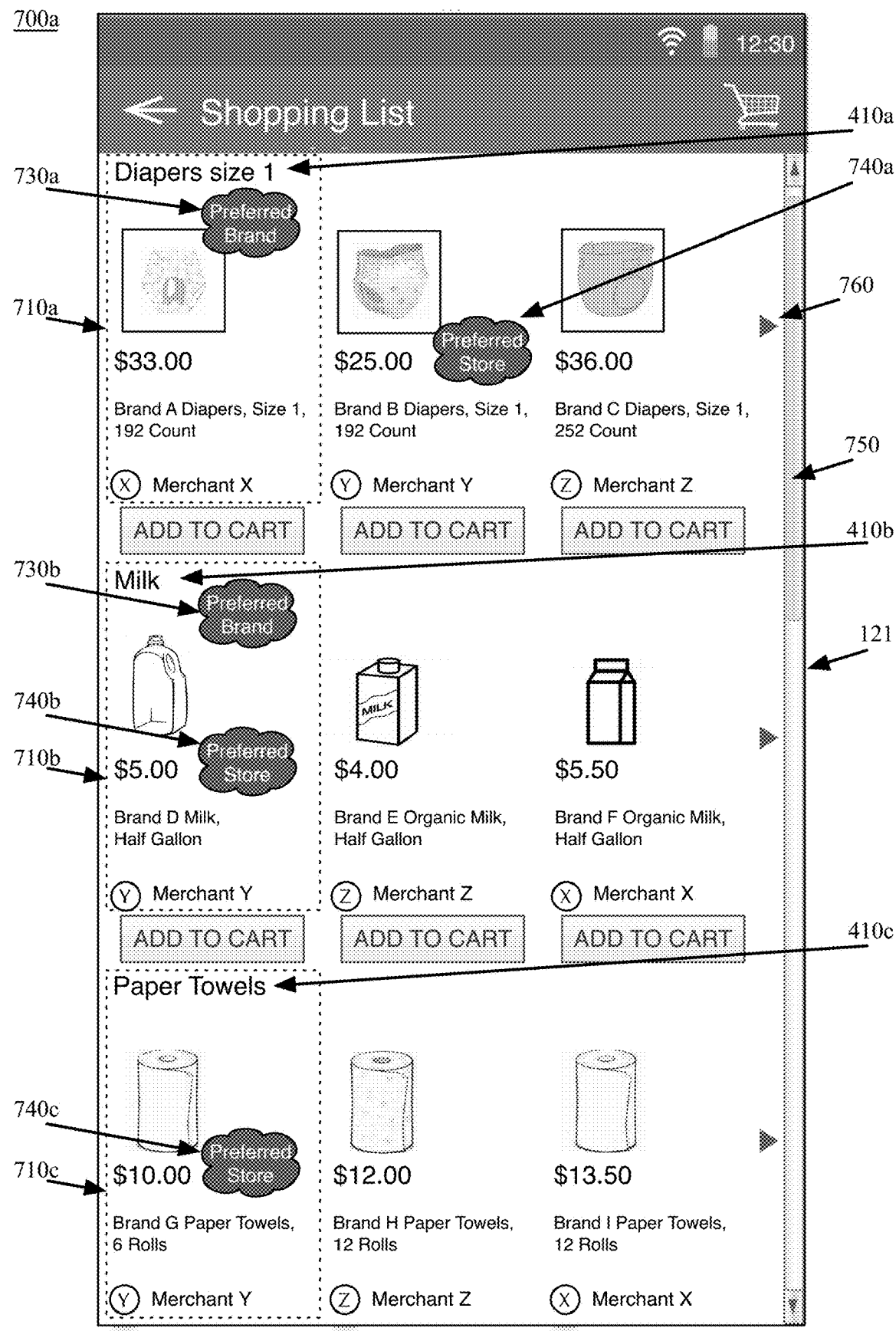
FIG. 7 is a block diagram depicting an optimized display of products on a user interface, in accordance with certain examples.
Figure 8:
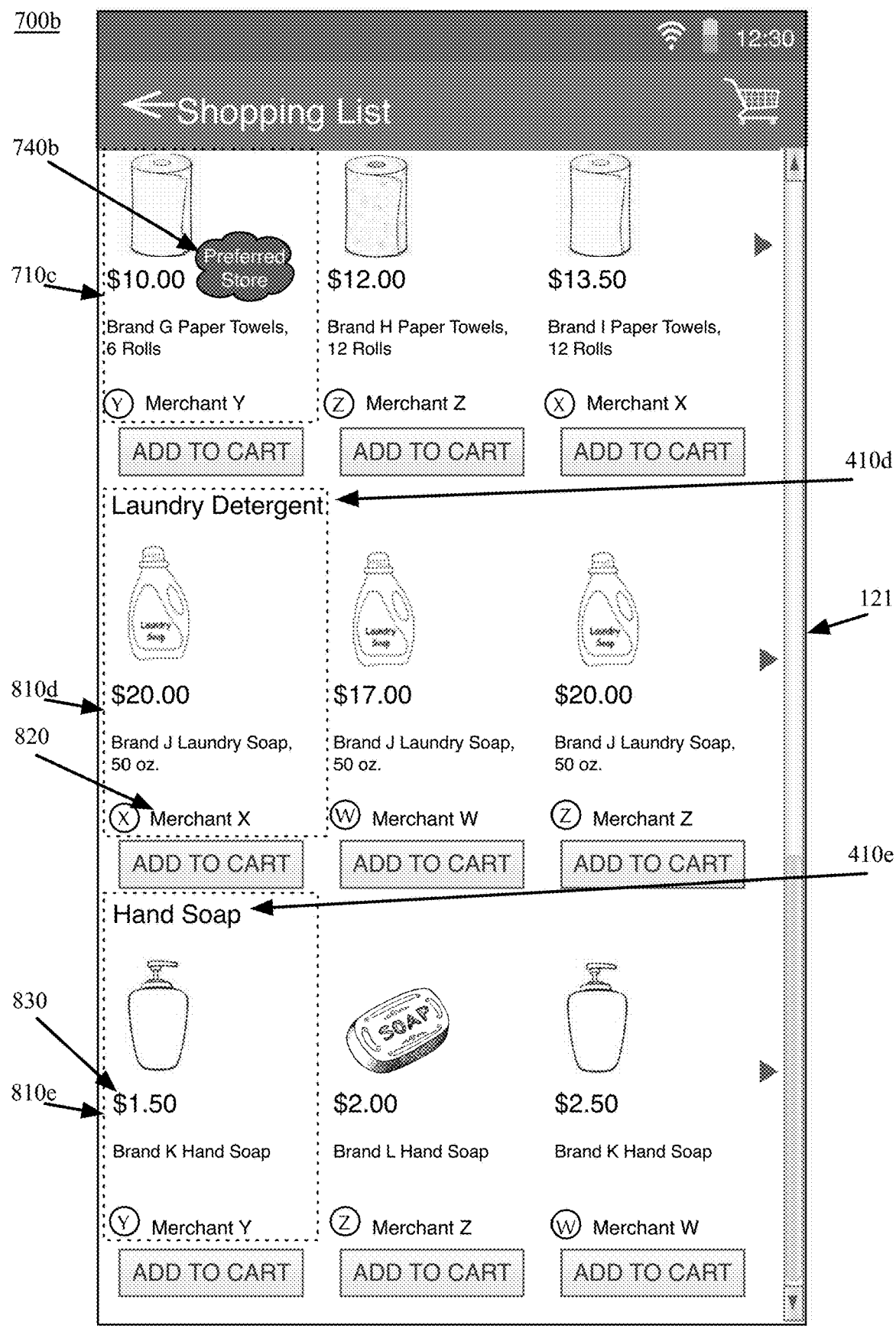
FIG. 8 is a block diagram depicting an optimized display of products on a user interface, in accordance with certain examples.

In an example, the user manipulates a user interface element displayed on the user interface 121 of the user computing device 120 to instruct the product management computing system 130 to present an optimized display of products available for purchase that correspond to the items displayed on the shopping list. An example shopping unit 133 communicates with the one or more merchant computing systems 110 to determine availability and pricing associated with each item on the user's shopping list. An example shopping unit 133 retrieves user preferences, shopping history, and related user information to present an optimized display listing on the user interface 121 of the user computing device 120. In an example, the optimized display listing comprises a listing of one or more products corresponding to the user's shopping list. An example optimized display of available products is shown in FIGS. 7 and 8.

The shopping lists, user preferences, shopping history, and related information are saved in the data storage unit 139. In an example, the data storage unit 139 can include any local or remote data storage structure accessible to the product management computing system 130 suitable for storing information. In an example, the data storage unit 139 stores encrypted information, such as HTML5 local storage.

It will be appreciated that the network connections shown are example and other means of establishing a communications link between the computers and devices can be used. Additionally, those having ordinary skill in the art and having the benefit of the present disclosure will appreciate that the computing devices illustrated in FIG. 1 can have any of several other suitable computer system configurations. For example a user computing device 120 embodied as a mobile phone or handheld computer may not include all the components described above.

Figure 9:
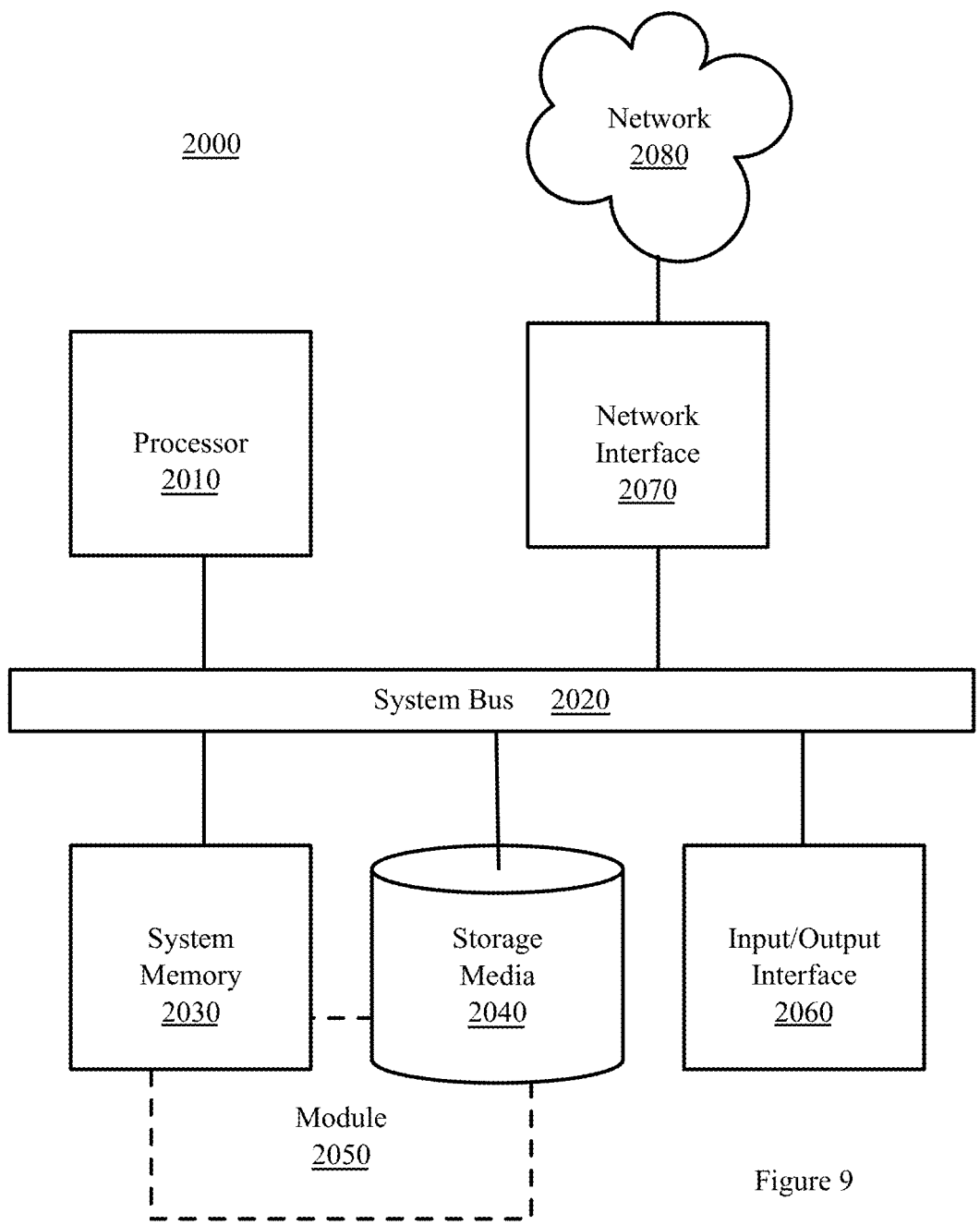
FIG. 9 is a block diagram depicting a computing machine and a module, in accordance with certain examples.

In examples, the network computing devices and any other computing machines associated with the technology presented herein may be any type of computing machine such as, but not limited to, those discussed in more detail with respect to FIG. 9. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 9. The computing machines discussed herein may communicate with one another, as well as with other computing machines or communication systems over one or more networks, such as network 140 and 2080. The network 140 and 2080 may comprise any type of data or communications network, including any of the network technology discussed with respect to FIG. 9.

Example Processes

The components of the example operating environment 100 are described hereinafter with reference to the example methods illustrated in FIGS. 2-3 and 5-6. The example methods of FIGS. 2-3 and 5-6 may also be performed with other systems and in other environments. The operations described with respect to any of the FIGS. 2-3 and 5-6 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Figure 2:
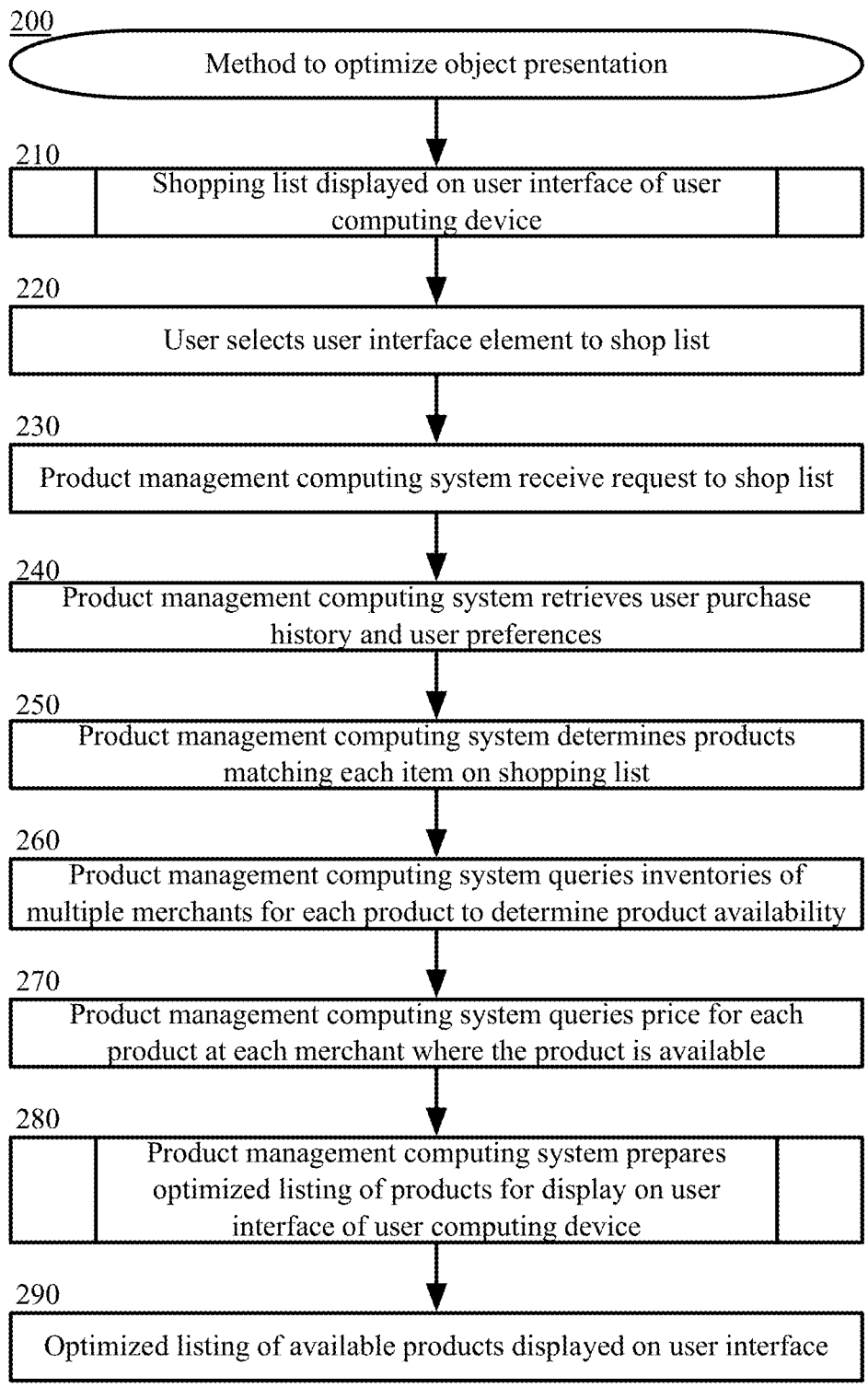
FIG. 2 is a block flow diagram depicting a method to optimize object presentation, in accordance with certain examples.

FIG. 2 is a block flow diagram depicting a method to method to optimize object presentation, in accordance with certain examples. The method 200 is described with reference to the components illustrated in FIG. 1.

In block 210, a shopping list is displayed on the user interface 121 of the user computing device 120. The method to display the shopping list on the user interface 121 is described in more detail hereinafter with reference to the methods described in FIG. 3. In an example, the shopping list comprises a listing of one or more terms entered by or on behalf of the user. An example listing of terms comprises generalized terms describing one or more items desired by the user. In an example, the generalized terms comprise an item description or broad category that corresponds to a shopping list item. For example, the generalized term is "milk" instead of the specific terms "Brand A Organic Skim Milk." In other examples, the listing of terms comprises specific terms entered by or on behalf of the user. In this example, the user enters or the product management computing system 130 determines the specific terms corresponding to the user's desired item.

Figure 3:
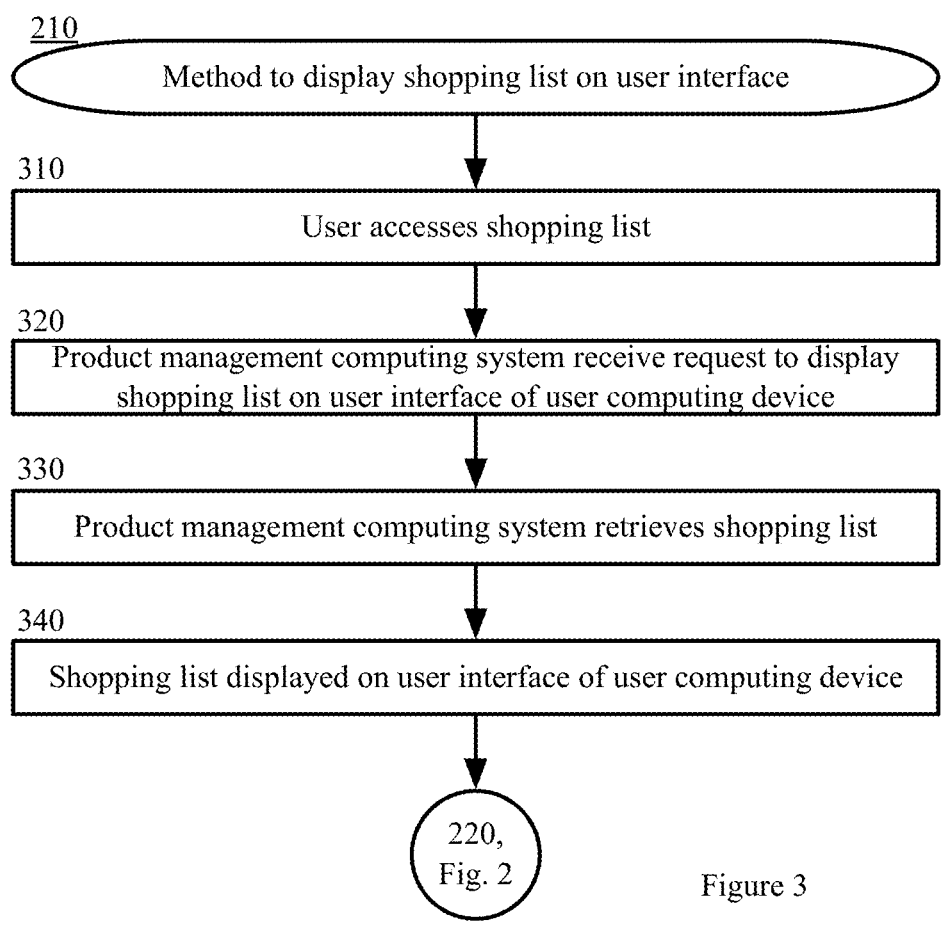
FIG. 3 is a block flow diagram depicting a method to display a shopping list on a user interface, in accordance with certain examples.

FIG. 3 is a block flow diagram depicting a method 210 to display a shopping list on a user interface 121, in accordance with certain examples, as referenced in block 210. The method 210 is described with reference to the components illustrated in FIG. 1.

In block 310, the user accesses a shopping list. In an example, the user opens or accesses an application 125 on the user computing device 120. The application 125 comprises a shopping list application 125 or web browser application 125 that enables the user computing device 120 to display the shopping list. In an example, the user has previously created and added items to the shopping list. In this example, the shopping list comprises a listing of one or more items or products that the user desires to purchase.

In an example the shopping list and/or application 125 comprises a user identifier or account identifier that enables the product management computing system 130 to identify the user or the user computing device 120. In another example, the user can create more than one shopping list. In this example, the user selects the desired shopping list using the application. For example, the user interface 121 displays an identifier or user interface element representing each of the one or more shopping lists and the user selects the desired shopping list by pressing or activating the user interface 121 element. In an example, each shopping list comprises an identifier that enables the product management computing system 130 to identify the particular shopping list.

In block 320, the product management computing system 130 receives the request to display the shopping list on the user interface 121 of the user computing device 120. In an example, the application 125 transmits a request to the product management computing system 130 that comprises one or more identifiers that enable the product management computing system 130 to identify the requested shopping list. In an example, the one or more identifiers comprise the user account identifier and/or the shopping list identifier.

In block 330, the product management computing system 130 retrieves the requested shopping list. In an example, the product management computing system 130 determines which shopping list corresponds to the one or more identifiers included in the request and retrieves the corresponding shopping list from the data storage unit 139.

In block 340, the shopping list is displayed on the user interface 121 of the user computing device 120. In an example, the product management computing system 130 transmits the retrieved shopping list to the application 125 for display on the user interface 121. In an example, the displayed shopping list comprises a listing of one or more products and a user interface 121 element that allows the user to add additional items to the shopping list. In another example, the displayed shopping list comprises a user interface 121 element that allows the user to instruct the application 125 to search for available products that correspond to the items on the shopping list.

The method 210 then proceeds to block 220 in FIG. 2.

FIG. 4 illustrates an example shopping list 400 displayed on a user interface 121 of a user computing device 120. In this example, the shopping list 400 comprises the following five items: size 1 diapers 410a, milk 410b, paper towels 410c, laundry detergent 410d, and hand soap 410e. In an example, the five items 410a through 410e are displayed in a vertical list with a single item on each line of the shopping list 400.

In another example, each item (410a through 410e) comprises a user interface 121 element on the left-most edge of each line on the list. For example, the user interface 121 element comprises a checkbox or button that is selectable by the user. In an example, the user can select the user interface 121 element to cross-off or indicate that an item was purchased. In another example, the user can swipe across the listed item to delete or cross-off the item.

In an example, the user can add additional items to the shopping list 400 by selecting the "Add Item" user interface element 430. In an example, when the "Add Item" user interface element 430 is selected, the user interface 121 displays a keyboard that allows the user to type in a desired item. In another example, the user can speak into a microphone component of the user computing device 120 to add an additional item. In an example, the user interface 121 displays the additional item in the listing of items 410.

In an example, the user can select a "Shop Your List" user interface element 440 to instruct the product management computing system 130 to search for available products that correspond to each item 410a through 410e listed in the shopping list 400.

Returning to FIG. 2, in block 220, the user selects a user interface 121 element that instructs the product management computing system 130 to search for available products that correspond to each item listed in the shopping list. Continuing with the previous example in FIG. 4, the user selects the "Shop Your List" user interface element 440 by pressing or hovering over the displayed user interface 121 element.

In block 230, the product management computing system 130 receives the request to shop the user's shopping list. In an example, the application 125 receives the user's selection of the user interface 121 element and communicates a request to the product management computing system 130. In this example, the request comprises an identifier for each product on the shopping list. In another example, the request further comprises an account identifier that corresponds to the user and/or the shopping list. In this example, the account identifier enables the product management computing system 130 to identify the user's account.

An example user's account comprises user preferences and/or shopping history. In an example, the product management computing system 130 maintains a history of prior purchases and/or selections made by the user. In this example, the product management computing system 130 can analyze the user's history to determine user preferences. For example, the user has previously purchased Brand AA chips on multiple occasions. The product management computing system 130 can determine that the user has a preference for Brand AA chips based on the multiple prior purchases.

In another example, the user defines or selects preferences. For example, the user can select options that instruct the product management computing system 130 that the user prefers the cheapest product choices, or that the user prefers to order/shop at the fewest number of merchant locations. In another example, the user can select options that instruct the product management computing system 130 that the user prefers Merchant CC, Brand BB products, whole milk, and/or organic products. In another example, the product management computing system 130 can analyze user actions and/or receive notices of user actions/preferences from another computing system to deduce user preferences. In an example, the user preferences and user purchase history are stored in the data storage unit 139 for retrieval and analysis by the product management computing system 130. In an example, the user preferences are continuously updated.

In block 240, the product management computing system 130 retrieves the user's purchase history and/or user preferences. In an example, the product management computing system 130 identifies the user account using the account identifier that corresponds to the user and/or the shopping list from the request to shop the user's shopping list.

In block 250, the product management computing system 130 determines which products correspond to each item listed on the shopping list. In an example, the product management computing system 130 identifies each product using the product identifiers from the request to shop the user's shopping list. In this example, the product management computing system 130 cross-references each product identifier with known products to identify the corresponding products.

In an example, an item listed on the shopping list is specific enough to enable the product management computing system 130 to identify a known product. Continuing with the previous example from FIG. 4, "Diapers size 1" 410a from the shopping list 400 will return a result of size 1 infant diapers of various brands. In another example, an item on the shopping list may return more than one type of specific product. Continuing with the previous example, "Milk" 410b from the shopping list 400 can return various different types of milk (for example, whole milk, condensed milk, powdered milk, chocolate milk), various different sizes (for example, half gallon, one can, one pint), and various different brands (for example, Brand A, Brand B, Brand C). In an example, the product management computing system 130 creates a predictive model or trains a classifier model to predict a known product that corresponds to the item listed on the shopping list based on prior product suggestions, the user's purchase history, and/or user preferences. In an example, the predictive model is an artificial neural network or other form of adaptive system model, wherein the system analyzes data and relationships to find patterns in data. In another example, the classifier model is a Gaussian Mixture Model, decision tree, Markov Decision Process, or other mathematical framework for modeling decision making. In an example, the model is trained based on historical data to predict a user's purchase intent based on previous products selected after entry of an item on a shopping list and user preference data received by the product management computing system 130. In an example, the process is an ongoing learning process, wherein data is continuously added to the product management computing system 130 and the model is continuously updated.

In block 260, the product management computing system 130 queries inventories of multiple merchant computing systems 110 for each product to determine product availability. In an example, the product management computing system 130 transmits a request to each merchant computing system 110 to determine whether each product is available at the merchant. In another example, the merchant computing systems 110 routinely communicate inventory to the product management computing system 130. In yet another example, the product management computing system 130 queries an online system or central database to determine where each product is available.

In block 270, the product management computing system 130 queries the price of each product at each of the merchants where the product is available. In an example, the product management computing system 130 transmits a request to each merchant computing system 110 to determine a price of each corresponding product available at the merchant. In another example, the merchant computing systems 110 routinely communicate prices to the product management computing system 130. In yet another example, the product management computing system 130 queries an online system or central database to determine pricing of each product.

In block 280, the product management computing system 130 prepares an optimized listing of products for display on the user interface 121 of the user computing device 120. The method to optimize the display of products is described in more detail hereinafter with reference to the methods described in FIGS. 5-6.

Figure 5:
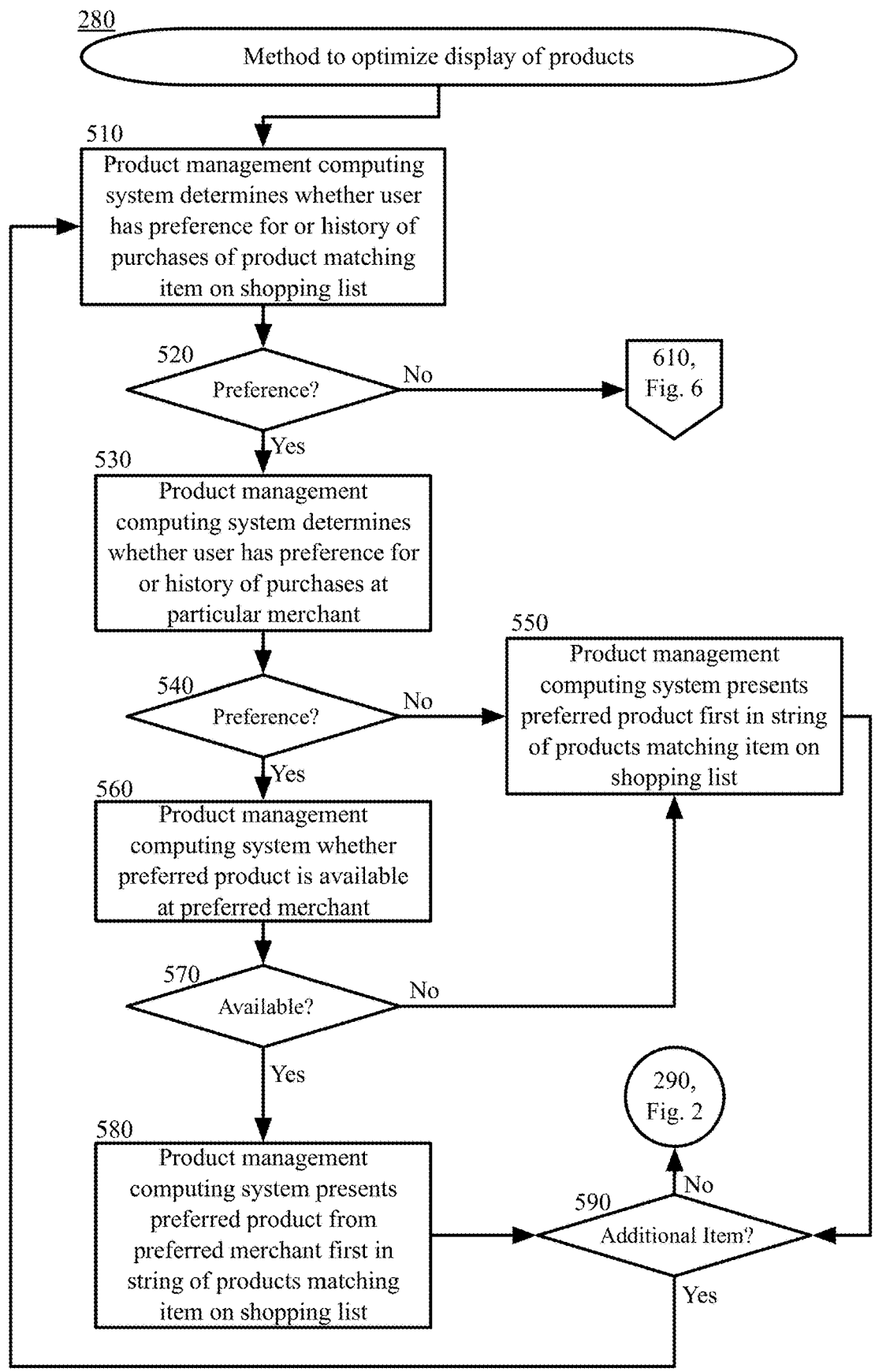
FIG. 5 is a block flow diagram depicting a method to optimize display of products, in accordance with certain examples.
Figure 6:
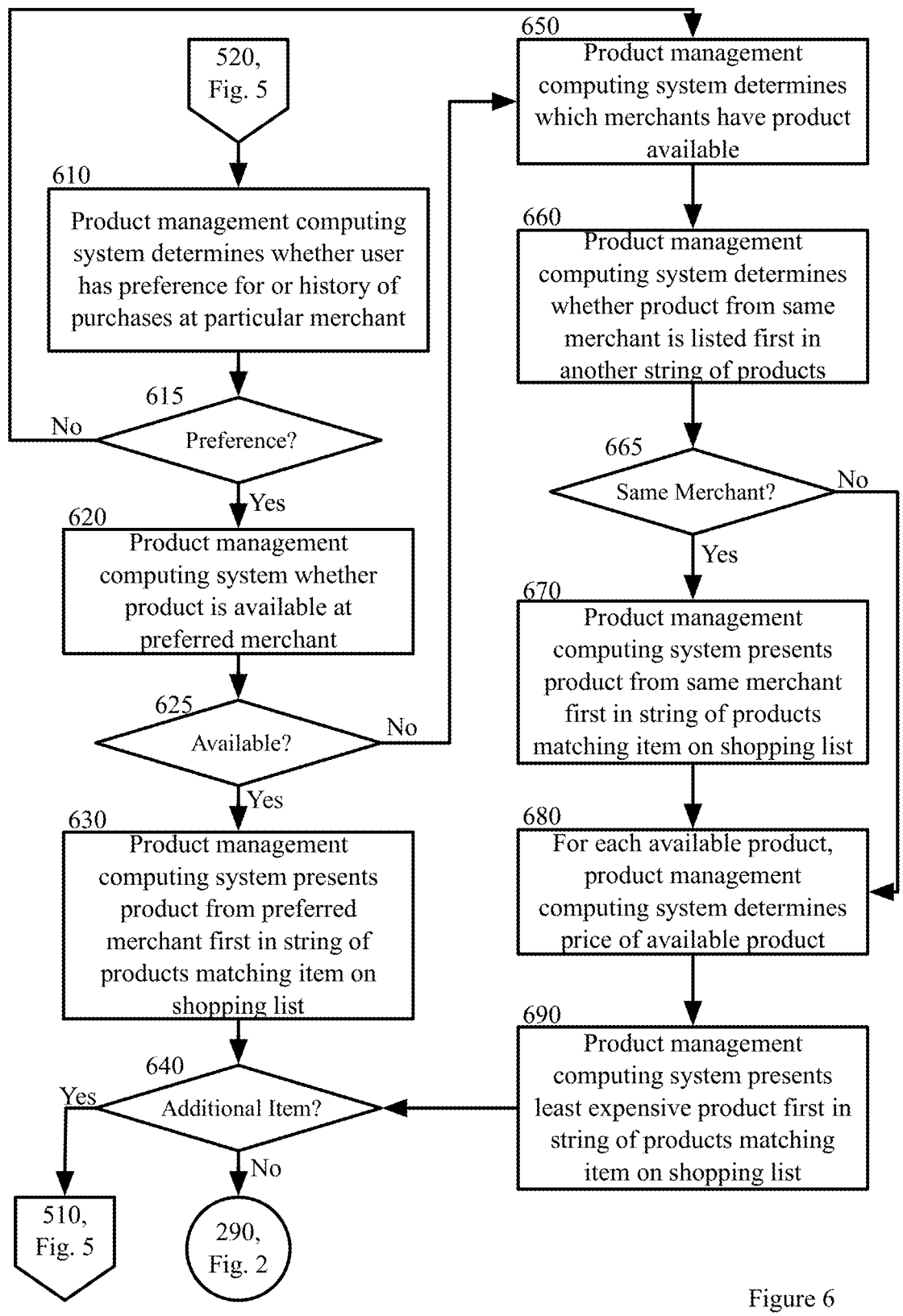
FIG. 6 is a block flow diagram depicting a method to optimize display of products, in accordance with certain examples.

FIGS. 5-6 are block flow diagrams depicting a method 280 to optimize the display of products, in accordance with certain examples, as referenced in block 280. The method 280 is described with reference to the components illustrated in FIG. 1. In an example, the methods described in FIGS. 5-6 are repeated for each item listed on the shopping list. In an example, the product management computing system 130 is determining an optimized order to present the product(s) identified in block 250 as corresponding to the item on the user's shopping list based first on the user's preferences for or against particular brands, merchants, and products.

In block 510, the product management computing system 130 determines whether the user has a preference for or a history of purchases for a product matching an item on the shopping list. In an example, the product management computing system 130 cross references the product(s) identified in block 250 as corresponding to the item on the user's shopping list to the user's purchase history and/or user preferences identified in block 240 to identify preferred products. In another example, the product management computing system 130 maps an identified product to known product purchases and user preferences to predict the user's intent when entering the item on the shopping list. For example, the product management computing system 130 can predict that the user intended to purchase Brand BB chips based on the user's known preference for Brand BB chips, even if the user only entered "chips" on the shopping list.

In yet another example, the product management computing system 130 creates a predictive model or trains a classifier model to predict a preferred product based on the user's purchase history and/or user preferences. In an example, the predictive model is an artificial neural network or other form of adaptive system model, wherein the system analyzes data and relationships to find patterns in data. In another example, the classifier model is a Gaussian Mixture Model, decision tree, Markov Decision Process, or other mathematical framework for modeling decision making. In an example, the model is trained based on historical data to predict a user's purchase intent based on previous products purchased after entry of an item on a shopping list and user preference data received by the product management computing system 130. In an example, the process is an ongoing learning process, wherein data is continuously added to the product management computing system 130 and the model is continuously updated.

In block 520, the product management computing system 130 determines whether the user has a preferred product that corresponds to the identified product. If the user has a preferred product, the method 280 proceeds to block 530 in FIG. 5.

In block 530, the product management computing system 130 determines whether the user has a preference for or history of purchases at a particular merchant. In an example, the product management computing system 130 cross references a list of merchant to the user's purchase history and/or user preferences identified in block 240 to identify one or more preferred merchants. In another example, the product management computing system 130 maps an identified preferred product to known merchant purchases and user preferences to predict the user's intent when entering the item on the shopping list. For example, the product management computing system 130 can predict that the user intended to purchase Brand BB chips from Merchant ABC based on the user's known preference for purchasing products at Merchant ABC, even if the user only entered "chips" on the shopping list.

In another example, the user defines one or more merchants as a "preferred merchant" when entering user preferences. In yet another example, the product management computing system 130 creates a predictive model or trains a classifier model to predict a preferred product based on the user's purchase history and/or user preferences. In an example, the model is trained based on historical data to predict a user's purchase intent based on previous purchases at particular merchants after entry of an item on a shopping list and user preference data received by the product management computing system 130.

In block 540, the product management computing system 130 determines whether the user has a preferred merchant. If the user does not have a preferred merchant, the method 280 proceeds to block 550 in FIG. 5.

In block 550, the product management computing system 130 presents the preferred product first in a string of products corresponding to the item on the user's shopping list. In this example, the product management computing system 130 has identified a preferred product in block 520, but did not identify a preferred merchant in block 540. The product management computing system 130 presents the preferred product in a highlighted position in a listing of products corresponding to the item on the user's shopping list. An example highlighted position comprises a position on the left-most edge of the listing of products. In this example, additional products corresponding to the item on the user's shopping list are list to the right of the preferred product. In another example, the preferred product is positioned in the center of the user interface 121. In yet another example, the preferred product is highlighted, comprises stylized text, or comprises an icon or badge indicating that the product is preferred.

From block 550, the method 280 continues to block 590 in FIG. 5.

FIG. 7 illustrates an example optimized display 700 of products on a user interface 121 of a user computing device 120. In this example, the items from the shopping list 400 (size 1 diapers 410*a*, milk 410*b*, paper towels 410*c*, laundry detergent 410*d*, and hand soap 410*e*) are displayed in a vertical list with one or more products corresponding to each item displayed in a horizontal list on each vertical line. In another example, the vertical listing of extends beyond the visible user interface 121 screen. In this example, a scroll bar element 750 is presented to allow the user to view different portions of the user interface 121 display 700*a*.

In this example, the user entered "diapers size 1" 410*a* on the shopping list 800. The product management computing system 130 determined Brand A size 1 diapers, Brand B size 1 diapers, and Brand C size 1 diapers correspond to the first item 410*a* on the user's shopping list 400. The product management computing system 130 also determined that Merchant X, Merchant Y, and Merchant Z have size 1 diapers that correspond to the first item 410*a* on the user's shopping list 400.

Continuing with this example, the product management computing system 130 then determined that the user has a preference for Brand A diapers based on the user's purchase history and/or user preferences. The product management computing system 130 can then predict that the user intends to purchase Brand A size 1 diapers 710*a* based on the user's known preference for Brand A diapers, even if the user only entered "size 1 diapers" 410*a* on the shopping list 400. In this example, the product management computing system 130 lists the preferred Brand A size 1 diapers first in position 710*a* and highlights the product as a preferred product using a design element 730*a*.

Returning to block 540 in FIG. 5, if the user has a preferred merchant, the method 280 proceeds to block 560 in FIG. 5.

In block 560, the product management computing system 130 determines whether the preferred product is available at the preferred merchant. In an example, the product management computing system 130 cross-references the product inventories identified in block 260 with the preferred merchant identified in block 540 for the preferred product identified in block 520 to determine whether the preferred merchant has sufficient inventory of the preferred product. In an example, sufficient inventory comprises one or more units of the preferred product.

In block 570, the product management computing system 130 determines whether preferred merchant has sufficient inventory of the preferred product. If the preferred merchant does not have sufficient inventory of the preferred product, the method 280 proceeds to block 550 in FIG. 5 and the product management computing system 130 presents the preferred product first in a string of products corresponding to the item on the user's shopping list. In this example, the product management computing system 130 has identified a preferred product in block 520 and a preferred merchant in block 540, but the preferred merchant did not have sufficient inventory of the preferred product in block 570. The product management computing system 130 presents the preferred product in a highlighted position in a listing of products corresponding to the item on the user's shopping list. An example highlighted position comprises a position on the left-most edge of the listing of products. In this example, additional products corresponding to the item on the user's shopping list are list to the right of the preferred product. In another example, the preferred product is positioned in the center of the user interface 121. In yet another example, the preferred product is highlighted, comprises stylized text, or comprises an icon or badge indicating that the product is preferred.

Continuing with the previous example, in FIG. 7, the product management computing system 130 determined that the user has a preference for Merchant Y, but Merchant Y does not have the preferred Brand A size 1 diapers. The product management computing system 130 lists the Brand B diapers sold by preferred Merchant Y in the second position to the right of the first position 710a and highlights the merchant as a preferred merchant using a second design element 740a. The product management computing system 130 lists the Brand C diapers sold by Merchant Z in the third position to the right of the second position. In an example, a user interface element 760 (for example an arrow) is presented if all of the products presented on the horizontal line are not visible on the user interface 121. The arrow allows the user to scroll and view the remaining products.

Returning to block 570 in FIG. 5, if the preferred merchant has sufficient inventory of the preferred product, the method 280 proceeds to block 580 in FIG. 5.

In block 580, the product management computing system 130 presents the preferred product from the preferred merchant first in a string of products corresponding to the item on the user's shopping list. In this example, the product management computing system 130 has identified a preferred product in block 520, a preferred merchant in block 540 and confirmed that the preferred merchant has sufficient inventory of the preferred product in block 570. The product management computing system 130 presents the preferred product from the preferred merchant in a highlighted position in a listing of products corresponding to the item on the user's shopping list. An example highlighted position comprises a position on the left-most edge of the listing of products. In this example, additional products corresponding to the item on the user's shopping list are list to the right of the preferred product from the preferred merchant. In another example, the preferred product from the preferred merchant is positioned in the center of the user interface 121. In yet another example, the preferred product from the preferred merchant is highlighted, comprises stylized text, or comprises an icon or badge indicating that the product is preferred.

Continuing with the previous example, FIG. 7 illustrates an example optimized display 700 of products on a user interface 121 of a user computing device 120. In this example, the items from the shopping list 400 (size 1 diapers 410a, milk 410b, paper towels 410c, laundry detergent 410d, and hand soap 410e) are displayed in a vertical list with one or more products corresponding to each item displayed in a horizontal list on each vertical line.

In an example, the user entered "milk" 410b on the shopping list 400. The product management computing system 130 determined Brand D milk, Brand E milk, and Brand F milk correspond to the second item 410b on the user's shopping list 400. The product management computing system 130 also determined that Merchant X, Merchant Y, and Merchant Z have milk that correspond to the second item 410b on the user's shopping list 400.

Continuing with this example, the product management computing system 130 then determined that the user has a preference for Brand D milk based on the user's purchase history and/or user preferences. The product management computing system 130 can then predict that the user intends to purchase Brand D milk 710b based on the user's known preference for Brand D milk, even if the user only entered "milk" 410b on the shopping list 400. In this example, the product management computing system 130 lists the preferred Brand D milk first in position 710b and highlights the product as a preferred product using a design element 730b.

The product management computing system 130 determined that the user has a preference for Merchant Y, and Merchant Y has sufficient inventory of the preferred Brand D milk. The product management computing system 130 lists the Brand D milk sold by preferred Merchant Y in the first position 710b and highlights the merchant as a preferred merchant using a second design element 740b. The product management computing system 130 lists the Brand E and Brand F milk sold by Merchant Z and Merchant X in the second and third positions to the right of the first position 710b. In an example, a user interface element 760 (for example an arrow) is presented if all of the products presented on the horizontal line are not visible on the user interface. The arrow allows the user to scroll and view the remaining products.

Returning to FIG. 5, from block 580, the method 280 proceeds to block 590. In block 590, the product management computing system 130 determines whether there are additional items on the user's shopping list. If there are additional items on the user's shopping list, the method 280 repeats from block 510 until all items on the user's shopping list have products optimally presented. Returning to block 590, if there are no additional items on the user's shopping list, the method 280 proceeds to block 290 in FIG. 2.

Returning to block 520 in FIG. 5, if the user does not have a preferred product, the method 280 proceeds to block 610 in FIG. 6. In block 610, the product management computing system 130 determines whether the user has a preference for or a history of purchases at a particular merchant. In this example, the product management computing system 130 determined that the user does not have a preferred product at block 520.

In an example, the product management computing system 130 determines whether the user has a preference for or history of purchases at a particular merchant. In an example, the product management computing system 130 cross references a list of merchant to the item on the user's shopping list to the user's purchase history and/or user preferences identified in block 240 to identify one or more preferred merchants. In another example, the product management computing system 130 maps an identified product to known merchant purchases and user preferences to predict the user's intent when entering the item on the shopping list. For example, the product management computing system 130 can predict that the user intended to purchase chips from Merchant MNO based on the user's known preference for purchasing products at Merchant MNO, even if the user only entered "chips" on the shopping list.

In another example, the user defines one or more merchants as a "preferred merchant" when entering user preferences. In yet another example, the product management computing system 130 creates a predictive model or trains a classifier model to predict a preferred product based on the user's purchase history and/or user preferences. In an example, the model is trained based on historical data to predict a user's purchase intent based on previous purchases at particular merchants after entry of an item on a shopping list and user preference data received by the product management computing system 130.

In block 615, the product management computing system 130 determines whether the user has a preferred merchant. If the user does not have a preferred merchant, the method 280 proceeds to block 650 in FIG. 6.

Returning to block 615, if the product management computing system 130 determines that the user has a preferred merchant, the method 280 proceeds to block 620. In block 620, the product management computing system 130 determines whether the product is available at the preferred merchant. In an example, the product management computing system 130 cross-references the product inventories identified in block 260 with the preferred merchant identified in block 615 to determine whether the preferred merchant has sufficient inventory of a product. In an example, sufficient inventory comprises one or more units of the product.

In block 625, the product management computing system 130 determines whether preferred merchant has sufficient inventory of the product. If the product management computing system 130 determines that the preferred merchant has sufficient inventory of the product, the method 280 proceeds to block 630. In block 630, the product management computing system 130 presents the product from the preferred merchant first in a string of products corresponding to the item on the user's shopping list. In this example, the product management computing system 130 has identified products in block 250, a preferred merchant in block 615 and confirmed that the preferred merchant has sufficient inventory of the product in block 625. The product management computing system 130 presents the product from the preferred merchant in a highlighted position in a listing of products corresponding to the item on the user's shopping list. An example highlighted position comprises a position on the left-most edge of the listing of products. In this example, additional products corresponding to the item on the user's shopping list are list to the right of the preferred product from the preferred merchant. In another example, the preferred product from the preferred merchant is positioned in the center of the user interface 121. In yet another example, the preferred product from the preferred merchant is highlighted, comprises stylized text, or comprises an icon or badge indicating that the product is preferred.

Continuing with the previous example, FIG. 7 illustrates an example optimized display 700 of products on a user interface 121 of a user computing device 120. In this example, the items from the shopping list 400 (size 1 diapers 410a, milk 410b, paper towels 410c, laundry detergent 410d, and hand soap 410e) are displayed in a vertical list with one or more products corresponding to each item displayed in a horizontal list on each vertical line.

In an example, the user entered "paper towels" 410c on the shopping list 800. The product management computing system 130 determined Brand G paper towels, Brand H paper towels, and Brand I paper towels correspond to the third item 410c on the user's shopping list 400. The product management computing system 130 also determined that Merchant X, Merchant Y, and Merchant Z have paper towels that correspond to the third item 410c on the user's shopping list 400.

Continuing with this example, the product management computing system 130 determined that the user does not have a preference for any of Brand G, Brand H, or Brand I paper towels based on the user's purchase history and/or user preferences. The product management computing system 130 then determined that the user has a preference for Merchant Y, and Merchant Y has sufficient inventory of Brand G paper towels. The product management computing system 130 lists the Brand G paper towels sold by preferred Merchant Y in the first position 710c and highlights the merchant as a preferred merchant using a design element 740c. The product management computing system 130 lists the Brand H and Brand I paper towels sold by Merchant Z and Merchant X in the second and third positions to the right of the first position 710c. In an example, a user interface element 760 (for example an arrow) is presented if all of the products presented on the horizontal line are not visible on the user interface. The arrow allows the user to scroll and view the remaining products.

Returning to FIG. 6, the method 280 then proceeds to block 640. In block 640, the product management computing system 130 determines whether there are additional items on the user's shopping list. If there are additional items on the user's shopping list, the method 280 repeats from block 510 in FIG. 5 until all items on the user's shopping list have products optimally presented. Returning to block 640 in FIG. 6, if there are no additional items on the user's shopping list, the method 280 proceeds to block 290 in FIG. 2.

Returning to FIG. 6, in block 625, if the preferred merchant does not have sufficient inventory of the product, the method 280 proceeds to block 650. In block 650, the product management computing system 130 determine which merchants have sufficient inventory of products that correspond to the item on the shopping list. In this example, the product management computing system 130 has identified the products in block 250 and determined that the user does not have a preferred merchant in block 615, or that the preferred merchant does not have sufficient inventory of the product in block 625. The product management computing system 130 cross-references the identified products from block 250 with the product inventories identified in block 260 to identify which merchants have sufficient inventory of the product(s).

In block 660, the product management computing system 130 determines whether a product that corresponds to the item from the shopping list (as identified in block 250) is available from a merchant that has another product presented in a highlighted position in a listing of products corresponding to a different item on the user's shopping list. For example, even though Merchant GHF is not a preferred merchant, a preferred product sold by Merchant GHF is presented first for another item on the user's shopping list. In this example, the product management computing system 130 would determine that a second product is available from Merchant GHF.

In block 665, the product management computing system 130 determines whether a product is available from the same merchant that has a different product presented in a highlighted position in the listing of products. If the same merchant does not have a highlighted position for a different product, the method 280 proceeds to block 680.

Returning to block 665, if the product management computing system 130 determines that a product that corresponds to the item from the shopping list (as identified in block 250) is available from a merchant that has another product presented in a highlighted position in a listing of products corresponding to a different item on the user's shopping list, the method proceeds to block 670. In block 670, the product management computing system 130 presents the product that corresponds to the item from the shopping list (as identified in block 250) that is available from the merchant in a highlighted position in a listing of products corresponding to the item on the user's shopping list. An example highlighted position comprises a position on the left-most edge of the listing of products. In this example, additional products corresponding to the item on the user's shopping list are list to the right of the preferred product from the preferred merchant. In another example, the preferred product from the preferred merchant is positioned in the center of the user interface 121. In yet another example, the preferred product from the preferred merchant is highlighted, comprises stylized text, or comprises an icon or badge indicating that the product is preferred.

Continuing with the previous example, FIG. 8 illustrates an example optimized display 700 of products on a user interface 121 of a user computing device 120. In this example, the items from the shopping list 400 (size 1 diapers 410a, milk 410b, paper towels 410c, laundry detergent 410d, and hand soap 410e) are displayed in a vertical list with one or more products corresponding to each item displayed in a horizontal list on each vertical line.

In an example, the user entered "laundry detergent" 410d on the shopping list. The product management computing system 130 determined Brand J laundry soap correspond to the fourth item 410d on the user's shopping list 400. The product management computing system 130 also determined that Merchant X, Merchant W, and Merchant Z have laundry detergent that correspond to the fourth item 410d on the user's shopping list 400.

Continuing with this example, the product management computing system 130 determined that the user does not have a preference for any brand of laundry detergent based on the user's purchase history and/or user preferences. The product management computing system 130 also determined that the user does not have a preference for a merchant or that preferred Merchant Y does not have sufficient inventory of a product that corresponds to the entry of laundry detergent 410d.

The product management computing system 130 determines that the Brand A size 1 diapers sold by Merchant X were previously listed in the first position 710a. Because Merchant X also has sufficient inventory of Brand J laundry detergent, the product management computing system 130 lists the Brand J laundry detergent sold by Merchant X in the first position 810d. In this example, the user is likely to order from or visit Merchant X for a different preferred product. By highlight the other available product from Merchant X, the user is presented with the most convenient location to obtain a second non-preferred product. The product management computing system 130 lists the Brand J laundry detergent sold by Merchant W and Merchant Z in the second and third positions to the right of the first position 810d. In an example, a user interface element 760 (for example an arrow) is presented if all of the products presented on the horizontal line are not visible on the user interface. The arrow allows the user to scroll and view the remaining products.

Returning to FIG. 6, the method 280 then proceeds to block 680. In block 680, the product management computing system 130 determines a price associated with each remaining product. In an example, the product management computing system 130 retrieves the prices queried in block 270 and determines the price for each remaining product that corresponds to an item on the shopping list.

In block 690, the product management computing system 130 presents the least expensive product that corresponds to the item from the shopping list (as identified in block 250) in a highlighted position in a listing of products corresponding to the item on the user's shopping list. An example highlighted position comprises a position on the left-most edge of the listing of products. In this example, additional products corresponding to the item on the user's shopping list are list to the right of the preferred product from the preferred merchant. In another example, the preferred product from the preferred merchant is positioned in the center of the user interface 121. In yet another example, the preferred product from the preferred merchant is highlighted, comprises stylized text, or comprises an icon or badge indicating that the product is preferred.

Continuing with the previous example, FIG. 8 illustrates an example optimized display 700 of products on a user interface 121 of a user computing device 120. In this example, the items from the shopping list 400 (size 1 diapers 410a, milk 410b, paper towels 410c, laundry detergent 410d, and hand soap 410e) are displayed in a vertical list with one or more products corresponding to each item displayed in a horizontal list on each vertical line.

In an example, the user entered "hand soap" 410e on the shopping list. The product management computing system 130 determined Brand K and Brand L hand soap correspond to the fifth item 410e on the user's shopping list 400. The product management computing system 130 also determined that Merchant Y, Merchant Z, and Merchant W have hand detergent that correspond to the fifth item 410e on the user's shopping list 400.

Continuing with this example, the product management computing system 130 determined that the user does not have a preference for any brand of laundry detergent based on the user's purchase history and/or user preferences. The product management computing system 130 also determined that the user does not have a preference for a merchant or that preferred Merchant Y does not have sufficient inventory of a product that corresponds to the entry of hand detergent 410e. The product management computing system 130 also determined that the a product that corresponds to the item from the shopping list (as identified in block 250) is not available from a merchant that has another product presented in a highlighted position in a listing of products corresponding to a different item on the user's shopping list.

Because the product management computing system 130 determines that the price of Brand K hand soap from Merchant Y is $1.50, which is less expensive than the $2.00 Brand L hand soap from Merchant Z and the $2.50 Brand K hand soap from Merchant W, the product management computing system 130 lists the Brand K hand soap sold by Merchant Y in the first position 810e. In this example, the user is likely to order or purchase the least expensive product corresponding to the desired item when a preferred item/merchant or a more convenient merchant is not available. The product management computing system 130 lists the Brand L hand soap sold by Merchant Z and the Brand K hand soap sold by Merchant W in the second and third positions to the right of the first position 810e. In an example, a user interface element 760 (for example an arrow) is presented if all of the products presented on the horizontal line are not visible on the user interface. The arrow allows the user to scroll and view the remaining products.

Returning to FIG. 6, the method 280 then proceeds to block 640. In block 640, the product management computing system 130 determines whether there are additional items on the user's shopping list. If there are additional items on the user's shopping list, the method 280 repeats from block 510 in FIG. 5 until all items on the user's shopping list have products optimally presented.

In an example, the user defines preferences or rules that define an order in which the product management computing system 130 assigns preferential products/merchants. For example, the user has a preference to purchase the least expensive items. In this example, the product management computing system 130 presents the least expensive product in a highlighted position in a listing of products corresponding to each item on the user's shopping list. In another example, the user has a preference to travel to the fewest number of merchants to obtain items from the shopping list. In this example, the product management computing system 130 presents products from the same merchant in a highlighted position in a listing of products corresponding to each item on the shopping list. In yet another example, the user has two or more preferences that are applied in combination or in sequential order.

In another example, the product management computing system 130 applies the methods described in FIGS. 5-6 to determine an order to present the remaining products in the listing of products corresponding to the item on the user's shopping list. For example, the product management computing system 130 applies the methods described in FIGS. 5-6 to determine which product to present in the second position to the right of the first position, in the third position to the right of the second position, and so on.

Returning to block 640 in FIG. 6, if there are no additional items on the user's shopping list, the method 280 proceeds to block 290 in FIG. 2.

Returning to FIG. 2, in block 290, the optimized listing of available products is displayed on the user interface 121 of the user computing device 120. In an example, the optimized listing comprises two or more products shown with at least one of the two or more products shown in a highlighted display position. In this example, showing the product in the highlighted display position directs the user's attention to the product. In an example, the determination of the optimized listing is performed in real time or near real time so that once the user presses the user interface 121 element to shop the list, the optimized display is returned to the user computing device 120.

Other Example Embodiments

FIG. 9 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain example embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternative embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to optimize object presentation on user interfaces, comprising:
   receiving, by one or more computing devices, a request to render a shopping list on a user interface of a user computing device, the shopping list comprising two or more item entries described in generalized terms;
   receiving, by the one or more computing devices, a notification of selection of a user interface element on the user computing device requesting presentation of products match each of the two or more item entries;
   determining, by the one or more computing devices, two or more first products that match a first item entry in the shopping list;
   analyzing, by the one or more computing devices, each of the two or more first products that match the first item entry by:
      determining, based at least in part on an output of an artificial neural network trained on historical data to predict user purchase intent based on one or more previous products selected after entry of an item on a shopping list, that a user of the user computing device has a preferred first product,
      in response to determining the preferred first product, determining that a particular product of the two or more first products comprises the preferred first product,
      determining that the user of the user computing device has a preferred provider, and
      determining availability of the preferred first product at the preferred provider;
   in response to determining that the preferred first product is available at the preferred provider, rendering, by the one or more computing devices, the preferred first product in a first highlighted position on the user interface of the user computing device with each remaining first product that matches the first item entry in a non-highlighted first position and one or more products associated with other item entries in the two or more item entries.

2. The computer-implemented method of claim 1, wherein determining whether the user has the first preferred product comprises determining whether the user previously selected the preferred first product.

3. The computer-implemented method of claim 1, wherein the first highlighted position comprises a position on a leftmost edge of a display of the two or more first products that match the first item entry.

4. The computer-implemented method of claim 3, wherein each remaining first product that match the first item entry are right of the first highlighted position.

5. The computer-implemented method of claim 1, wherein the preferred first product is available at the preferred provider and wherein the first highlighted position comprises the preferred first product available to the preferred provider.

6. The computer-implemented method of claim 1, wherein the preferred first product is not available at the preferred provider and wherein analyzing each of the two or more first product that match the first item entry further comprises determining availability of the preferred first product at a second provider.

7. The computer-implemented method of claim 6, wherein the preferred first product is available at the second provider and wherein the first highlighted position comprises the preferred first product available to at a second provider.

8. The computer-implemented method of claim 1, further comprising:
   determining, by the one or more computing devices, two or more second products that match a second item entry in the shopping list; and
   analyzing, by the one or more computing devices, each of the two or more second products that match the second item entry.

9. The computer-implemented method of claim 8, wherein the user does not have a preferred second product and wherein analyzing each of the two or more second products that match the second item entry further comprises:
   determining availability of a second product at a second provider, and
   determining that an product available at the second provider is rendered a highlighted position on the user interface of the user computing device.

10. The computer-implemented method of claim 9, further comprising rendering, by the one or more computing devices, the second product available at the second provider in a second highlighted position on the user interface of the user computing device with each remaining second product that matches the second item entry in a non-highlighted second position.

11. A computer program product, comprising:
   a non-transitory computer-readable storage device having computer readable program instructions embodied therein that when executed by a user computing device cause the user computing device to optimize object presentation on user interfaces, the computer-readable program instructions comprising:
   computer-readable program instructions to receive a request to render a shopping list on a user interface of a user computing device, the shopping list comprising two or more item entries described in generalized terms;
   computer-readable program instructions to receive a notification of selection of a user interface element on the user computing device requesting presentation of products match each of the two or more item entries;

computer-readable program instructions to determine two or more first products that match a first item entry in the shopping list;

computer-readable program instructions to analyze each of the two or more first products that match the first item entry by:
  determining, based at least in part on an output of an artificial neural network trained on historical data to predict user purchase intent based on one or more previous products selected after entry of an item on a shopping list, that a user of the user computing device has a preferred first product,
  in response to determining the preferred first product, determining that a particular product of the two or more first products comprises the preferred first product,
  determining that the user of the user computing device has a preferred provider, and
  determining availability of the preferred first product at the preferred provider; and computer-readable program instructions to render, in response to determining that the preferred first product is available at the preferred provider, render the preferred first product in a first highlighted position on the user interface of the user computing device with each remaining first product that matches the first item entry in a non-highlighted first position and one or more products associated with other item entries in the two or more item entries.

12. The computer program product of claim 11, wherein determining whether the user has the first preferred product comprises determining whether the user previously selected the preferred first product.

13. The computer program product of claim 11, wherein the first highlighted position comprises a position on a leftmost edge of a display of the two or more first product that match the first item entry, and wherein each remaining first products that match the first item entry are right of the first highlighted position.

14. The computer program product of claim 11, wherein the preferred first product is available at the preferred provider and wherein the first highlighted position comprises the preferred first product available to the preferred provider.

15. The computer program product of claim 11, wherein the preferred first product is not available at the preferred provider and wherein analyzing each of the two or more first products that match the first item entry further comprises determining that the preferred first product is available at a second provider, wherein the first highlighted position comprises the preferred first product available to at a second provider.

16. A system to-optimize object presentation on user interfaces, comprising:
  a storage device; and
  a processor communicatively coupled to the storage device, wherein the processor executes application code instructions that are stored in the storage device to cause the system to: receiving, by one or more computing devices, a request to render a shopping list on a user interface of a user computing device, the shopping list comprising two or more item entries described in generalized terms;

receive a notification of selection of a user interface element on the user computing device requesting presentation of products match each of the two or more item entries;

determine two or more first products that match a first item entry in the shopping list;

analyzing each of the two or more first products that match the first item entry by:
    determine, based at least in part on an output of an artificial neural network trained on historical data to predict user purchase intent based on one or more previous products selected after entry of an item on a shopping list, that a user of the user computing device has a preferred first product,
    in response to determining the preferred first product, determine that a particular product of the two or more first products comprises the preferred first product,
    determine that the user of the user computing device has a preferred provider, and
    determine availability of the preferred first product at the preferred provider; and in response to determining that the preferred first product is available at the preferred provider, render the preferred first product in a first highlighted position on the user interface of the user computing device with each remaining first product that matches the first item entry in a non-highlighted first position and one or more products associated with other item entries in the two or more item entries.

17. The system of claim 16, wherein determining whether the user has the first preferred product comprises determining whether the user previously selected the preferred first product.

18. The system of claim 16, wherein the first highlighted position comprises a position on a leftmost edge of a display of the two or more first products that match the first item entry, and wherein each remaining first product that match the first item entry are right of the first highlighted position.

19. The system of claim 16, wherein the preferred first product is available at the preferred provider and wherein the first highlighted position comprises the preferred first product available to the preferred provider.

20. The system of claim 16, wherein the preferred first product is not available at the preferred provider and wherein analyzing each of the two or more first products that match the first item entry further comprises determining that the preferred first product is available at a second provider, wherein the first highlighted position comprises the preferred first product available to at a second provider.

* * * * *